Feb. 9, 1932.  W. W. RANDALL  1,843,988
DETACHABLE BODY FREIGHT CAR
Filed Dec. 5, 1929  2 Sheets-Sheet 1
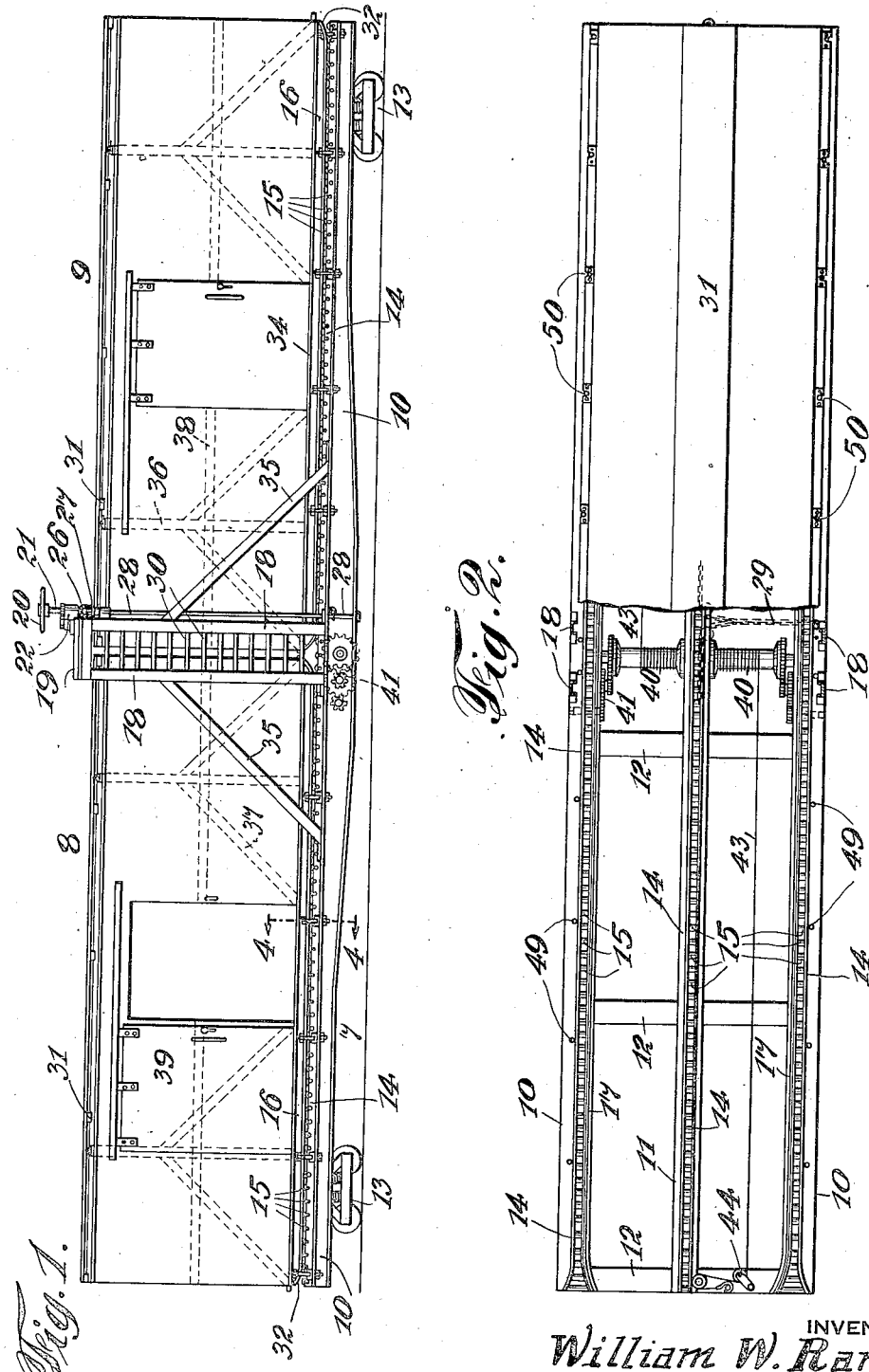
INVENTOR
William W. Randall
BY
Mason Fenwick & Lawrence
ATTORNEYS Feb. 9, 1932.   W. W. RANDALL   1,843,988
DETACHABLE BODY FREIGHT CAR
Filed Dec. 5, 1929   2 Sheets-Sheet 2
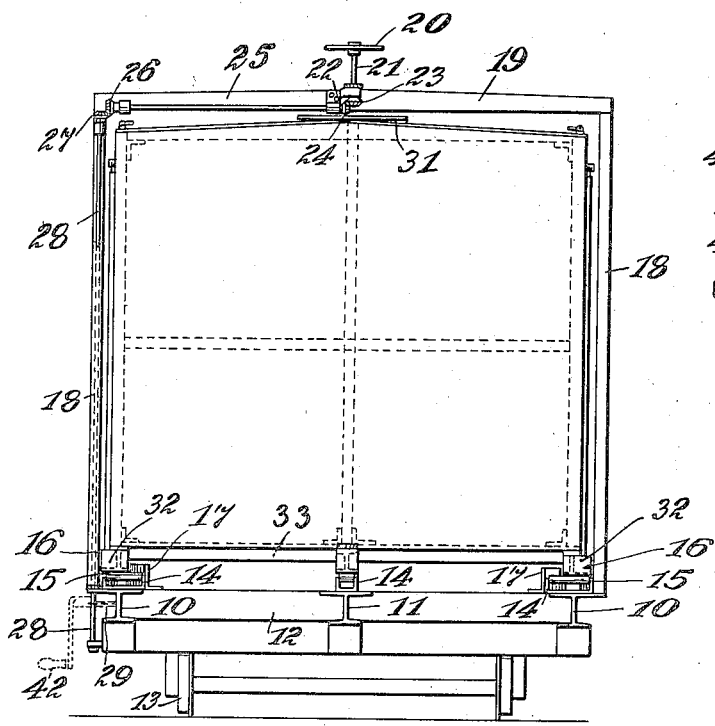
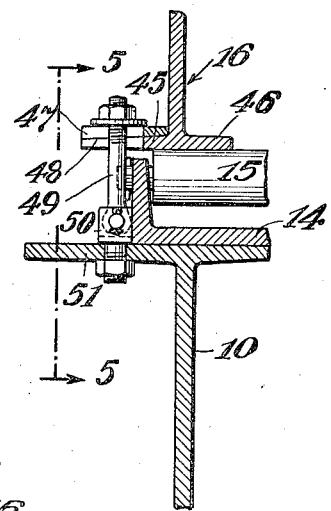
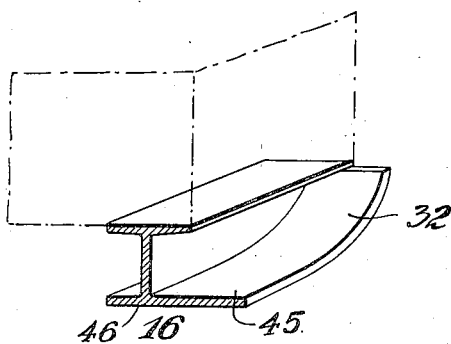
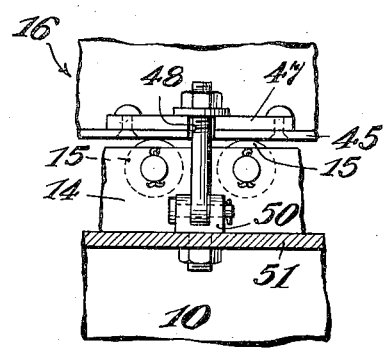
INVENTOR
William W. Randall
BY
Mason Fenwick Lawrence
ATTORNEY Patented Feb. 9, 1932

1,843,988

UNITED STATES PATENT OFFICE

WILLIAM WALLACE RANDALL, OF NEWARK, NEW JERSEY

DETACHABLE BODY FREIGHT CAR

Application filed December 5, 1929. Serial No. 411,882.

My invention relates to freight cars provided with a plurality of container bodies detachable from the chassis, so that each body can be loaded for a separate consignee or destination, and on arrival at the station can be transferred, without breaking bulk, to a motor truck or steamship hold for delivery to the respective consignee.

Among the principal objects of my invention are to improve the construction of the chassis and brake mechanism and detachable bodies and to facilitate and perfect the attachment of the bodies to and their detachment from the chassis.

To these and other ends my invention comprises a new and improved construction and arrangement of the chassis and detachable bodies with reference to their respective functions and to each other, improved means for attaching the bodies to the chassis and detaching them from it, and other novel features of construction and arrangement, all as hereinafter fully described, and pointed out in the claim.

In order that my invention may be fully understood, I shall first describe in detail the mode in which I, at present, prefer to carry the invention into practice.

Reference is to be had to the accompanying drawings forming part of this application in which like parts are designated by the same numbers in all the figures.

Figure 1 is a side elevation of a railway freight car with two detachable bodies embodying my invention.

Figure 2 is a plan view of the same, one portable body being removed and part of the other broken away.

Figure 3 is an end elevation of the same.

Figures 4, 5, and 6, are enlarged views of details hereinafter referred to and described.

In the specific embodiment of my invention shown in the drawings, the chassis frame 7, which forms a bed for the detachable bodies 8, 9, is formed of two longitudinal side beams, in this example T-beams 10, a central longitudinal beam 11, and cross beams 12, rigidly connecting the longitudinal beams 10 and 11. The frame 7 is mounted on wheels 13, in the usual or any approved fashion, and the longitudinal beams 10 and 11 are made deeper at the middle of the car than at the ends to stiffen and strengthen the frame against vertical strains.

On top of the longitudinal beams 10 and 11, are secured channel beams 14, in the upwardly opening channels of which are journaled at suitable intervals anti-friction rolls 15, forming three longitudinal anti-friction tracks, on which the runners 16, hereinafter described, of the detachable bodies 8 and 9 can be drawn easily on and off the chassis, or from which they can be easily lifted or upon which they can be easily lowered as by means of a crane or derrick.

On the inside of both side channel beams 14 and rising above the same, are secured longitudinal guard rails 17, to prevent the body runners 16 from being deflected laterally from the channel tracks.

The vertical flanges of the respective channel irons 14 at the ends thereof diverge gradually, to center and guide the body runners 16 upon the channel iron tracks.

The inside guard rails 17 at the ends of the channel irons 14, are for the same reason curved inwardly to correspond with the curve of the inside channel iron flanges against which they rest, as shown best in Figure 3.

Upon the I-beams 10 on each side of the chassis outside the channel irons 14 and at the longitudinal middle of the chassis are erected a pair of posts 18, braced by diagonal members 35, the upper ends of which opposite pairs of posts are rigidly connected by a cross-beam forming a bridge 19, under which the inner ends of the bodies 8, 9, are fitted to approach to a meeting as shown in Figure 1.

On the bridge 19 is mounted the brake gear for the car wheels, consisting in the present example, of a brake wheel 20, on a vertical shaft 21 turning in a bearing 22, fixed to the bridge, the shaft 21 carrying a bevel gear 23 engaging a bevel gear 24 on a horizontal shaft 25.

It will be seen from the above description that the novel point of construction in the present invention is that both of the detachable bodies may be removed or rolled off either one or the other end of the chassis of the car. This is particularly desirable in cars of this special character as otherwise, in many situations the car would have to be handled by a locomotive and reversed if there was any obstruction that prevented both bodies from rolling off either end of the chassis. This peculiar construction of the chassis also demands that the usual brake mechanism which is located at the end of a car be otherwise constructed so as to leave the car longitudinally unobstructed for the rolling of the body sections the full length of the car in either direction.

The shaft 25 carries a bevel gear 26 engaging a bevel gear 27 on a vertical shaft 28 extending downward on the side of the bridge 19, on the lower end of which shaft 28 is wound the chain 29 to operate the usual brakes on the wheels.

The posts 18 of each pair are connected by cross-slats 30 to form ladders for the trainmen for access to the bridge 19, and to the registering longitudinal walks 31 running along the tops of the bodies 8 and 9 at the transverse middle thereof.

Each detachable container body 8 and 9 is based and built on three longitudinal, in this case, I-beams, forming the runners 16 previously referred to and riding on the anti-friction rolls 15 in the track channel irons 14.

The ends of the bottom plates 32 of the I-beams or runners 16 are curved upward as shown in Figure 6 to a meeting with the top plates thereof to guide and facilitate the entrance of the runners to the track channel irons 14.

The runners 16 of each body 8, 9, are rigidly connected by cross-beams 33, to carry the flooring 34, and the side walls of each body 8, 9, are constructed with the usual framing, consisting of posts 36, diagonals 37, and stringers 38, as indicated in dotted lines in Figure 1, and with the usual sliding doors 39.

The tops and end walls of each body 8, 9, are formed as usual with the necessary framing and covering erected on the framing of the side and end walls.

In bearings on the I-beams 10 and 11 of the chassis, between said side and middle beams respectively, I prefer to mount transverse drums 40 of windlasses operated by gearing 41 and a crank handle 42 (indicated in dotted lines in Figure 6). On the drums are wound chains 43 provided with means for hooking or otherwise fastening them to the detachable bodies and with end pulleys 44 on the chassis, by which the bodies can be conveniently drawn on or off the same along the anti-friction tracks, from or to the motor truck, where a crane or derrick is not used for lifting and lowering the bodies in place.

It will be seen from the above that if it is desired to remove both of the bodies from the chassis at the same end that the cable 43 may be passed about the pulley 44 and the hook secured to the cable then drawn the length of the body and hooked in any desirable position so that when the windlass is operated the body will be projected from the chassis on to a platform or truck, or on to another chassis. One windlass might be used conveniently for drawing the bodies off either end, but I prefer to use two as this will allow application of the power in locations where one of the operating handles would not be properly accessible on account of adjoining tracks or adjoining cars.

For locking the bodies 89 to the trucks when placed in position thereon, I prefer to use the following means, shown in detail in Figures 4 and 5.

I make the outer part of the bottom plate of each runner 16 wider than the inner part 46 thereof, and fasten thereon reinforcing plates 47. In the plate 45 and reinforcing plates 47, I form transverse outwardly opening bolt slots 48, to receive bolts 49, pivoted to bearings 50, fixed to the top plate 51 of the corresponding I-beam 10, nuts 52 being provided on the bolts, so that all the bolts 49 can be swung inward into the slots 48 and the nuts 52 tightened thereon securely to lock the bodies in place on the chassis.

When the bodies are to be removed from the chassis, the nuts 52 are loosened, and the bolts 49 swung out of the slots 48 to release the bodies from the chassis.

It is evident that many changes may be made in the details of the embodiment of my invention herein described without departing from the boundaries thereof as set forth in the following claims.

I claim as my invention:

1. In a freight car having a plurality of slidable removable bodies, and vertical side supports, with ladders, between its ends, a transverse bridge on said side supports under which the container bodies can pass, the container bodies having longitudinal walks on their tops leading from the bridge, and wheel brake operating means mounted on the bridge.

2. A freight car having a chassis with longitudinal tracks and longitudinally movable bodies, in which the tracks consist of channel irons and guard rails extend alongside the channel irons and rise above the vertical side plates of the same.

3. A freight car having a chassis with longitudinal tracks and longitudinally movable bodies, in which the runners on the detachable bodies consist of I-beams, the lower plates of which curve upward at the ends to the upper plates.

4. A freight car having a chassis with longitudinal tracks and longitudinally movable bodies, in which the runners on the detachable bodies consist of I-beams, the outer parts of the lower plates of which are wider than the inner parts thereof to serve also as bearings for the locking devices.

5. A freight car having a chassis with longitudinal tracks and longitudinally movable bodies, in which the chassis is constructed with longitudinal I-beams and longitudinal channel irons secured on top of the I-beams to serve as tracks for the body runners.

6. A freight car having a chassis with longitudinal tracks and longitudinally movable bodies, in which the chassis is constructed with longitudinal side and medial I-beams, and windlass drums journaled transversely in and between the respective side and middle I-beams.

7. In a freight car, the combination with a flat chassis, of a plurality of slidable removable bodies mounted thereon to be removed from either end thereof, an overhead structure supported by the chassis to extend over said removable bodies and a brake mechanism and operating gear mounted on the overhead structure, said overhead structure providing clearance for the free movement of the slidable bodies.

In testimony whereof I affix my signature.

WILLIAM WALLACE RANDALL.